United States Patent [19]

Benning et al.

[11] Patent Number: 4,538,031
[45] Date of Patent: * Aug. 27, 1985

[54] HOME COMMUNICATIONS AND CONTROL SYSTEM

[75] Inventors: Gordon D. Benning, Ottawa; Brian J. Pascas; Robert K. Blackhall, both of Kanata; Paul S. Wilker, Ottawa; Graham A. Neathway, Almonte, all of Canada

[73] Assignee: Trillium Telephone Systems Inc., Canada

[*] Notice: The portion of the term of this patent subsequent to Jul. 10, 2001 has been disclaimed.

[21] Appl. No.: 416,612

[22] Filed: Sep. 10, 1982

[30] Foreign Application Priority Data

Sep. 11, 1981 [CA] Canada .................................. 385716

[51] Int. Cl.³ ....................... H04M 1/60; H04M 1/72; H04M 3/42; H04M 11/00
[52] U.S. Cl. .................................. 179/81 B; 179/2 A
[58] Field of Search .......................... 179/81 B, 37–40, 179/99 A, 99 P, 2 A, 84 T

[56] References Cited

U.S. PATENT DOCUMENTS

| | | | |
|---|---|---|---|
| 4,079,212 | 3/1978 | Sasai | 179/99 P |
| 4,088,846 | 5/1978 | McEowen | 179/18 ADX |
| 4,097,690 | 6/1978 | Kuntz et al. | 179/2 A |
| 4,100,375 | 7/1978 | Noller | 179/2 A |
| 4,196,317 | 4/1980 | Bartelink | 179/37 |

Primary Examiner—Thomas W. Brown
Attorney, Agent, or Firm—Antonelli, Terry & Wands

[57] ABSTRACT

A service circuit for a local telephone line in a building wired with quad telephone conductors, including a tip and ring lead pair continuous with a subscriber's line connected to a remote switching machine, and a service lead pair within the building. A special service circuit is connected to the tip and ring lead pair and to the service lead pair. A control unit is also connected to the tip and ring lead pair and the service lead pair for receiving signals over either the tip and ring pair or the service lead pair from a telephone connected to the local line, and for generating a predetermined special service circuit enabling signal on the service lead pair. The enabling signal is received by the special service circuit which implements one or more special services in response thereto. The control unit also applies operating power to the service lead pair. The special services implemented include intercom, paging, tone ringing, etc. The control unit also provides power, control, rapid dialing signals, etc.

22 Claims, 12 Drawing Figures

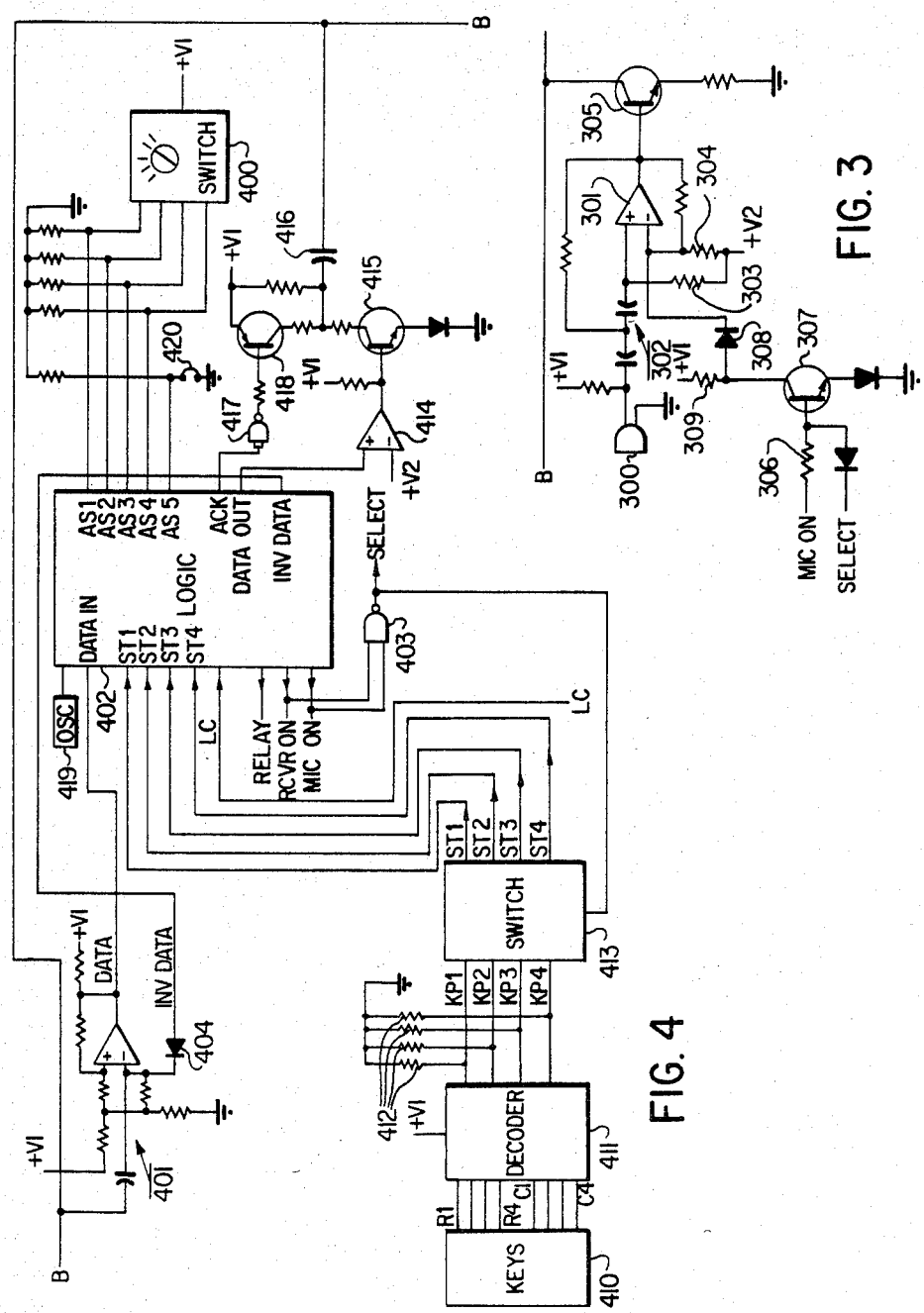

Figures 6, 7:
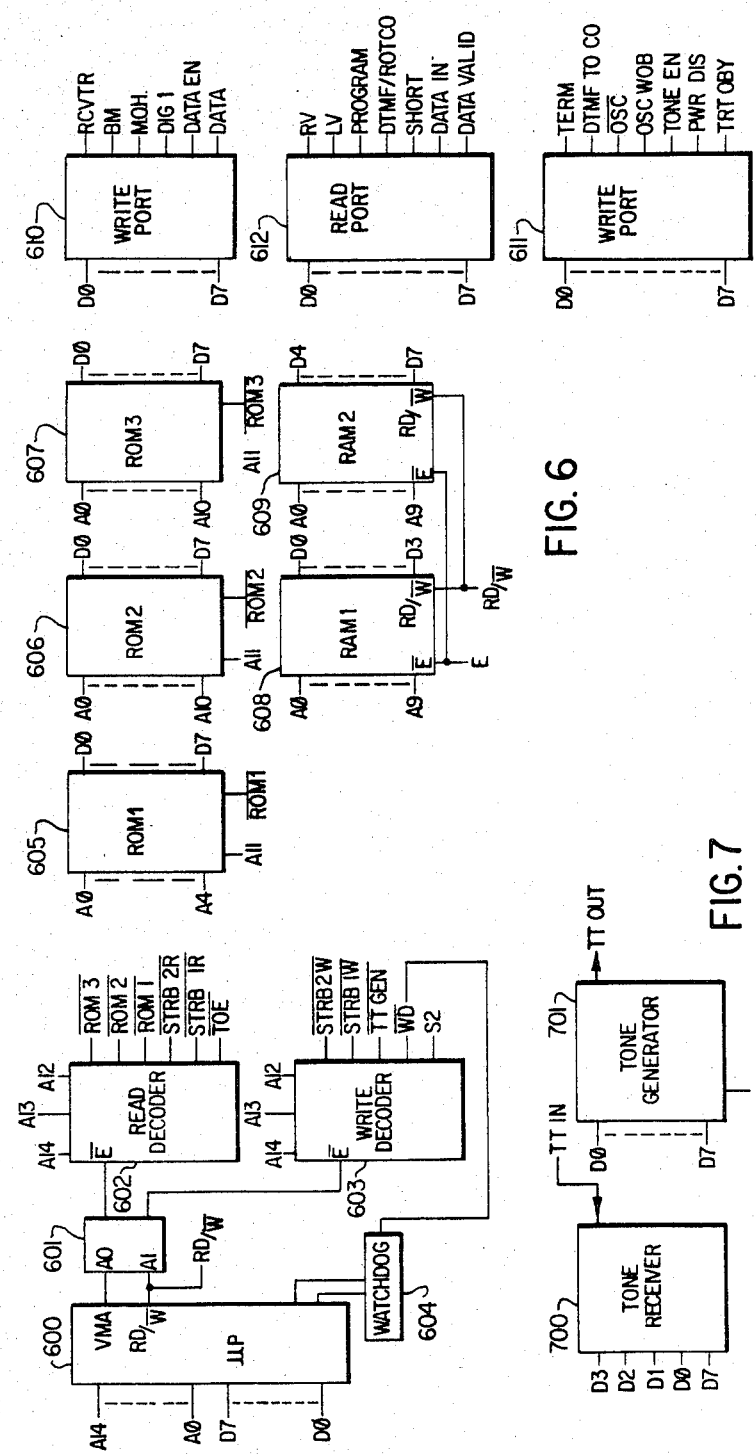

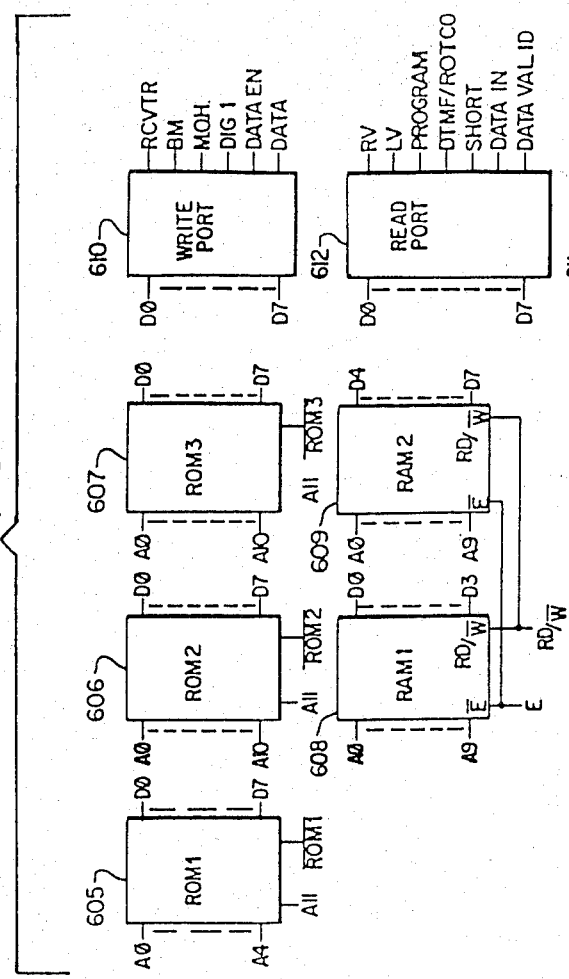
FIG. 6B
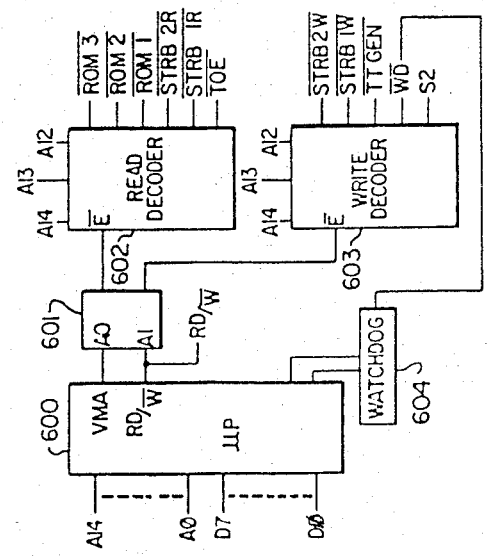
FIG. 6A
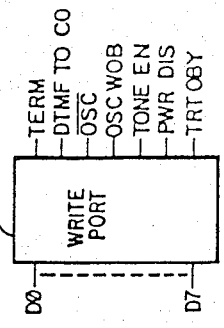
FIG 7
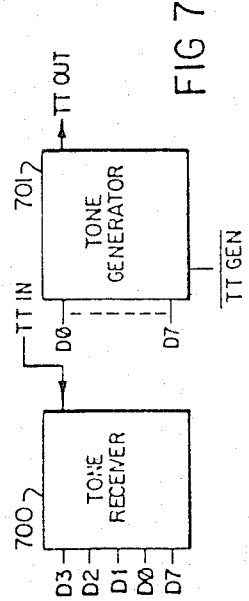

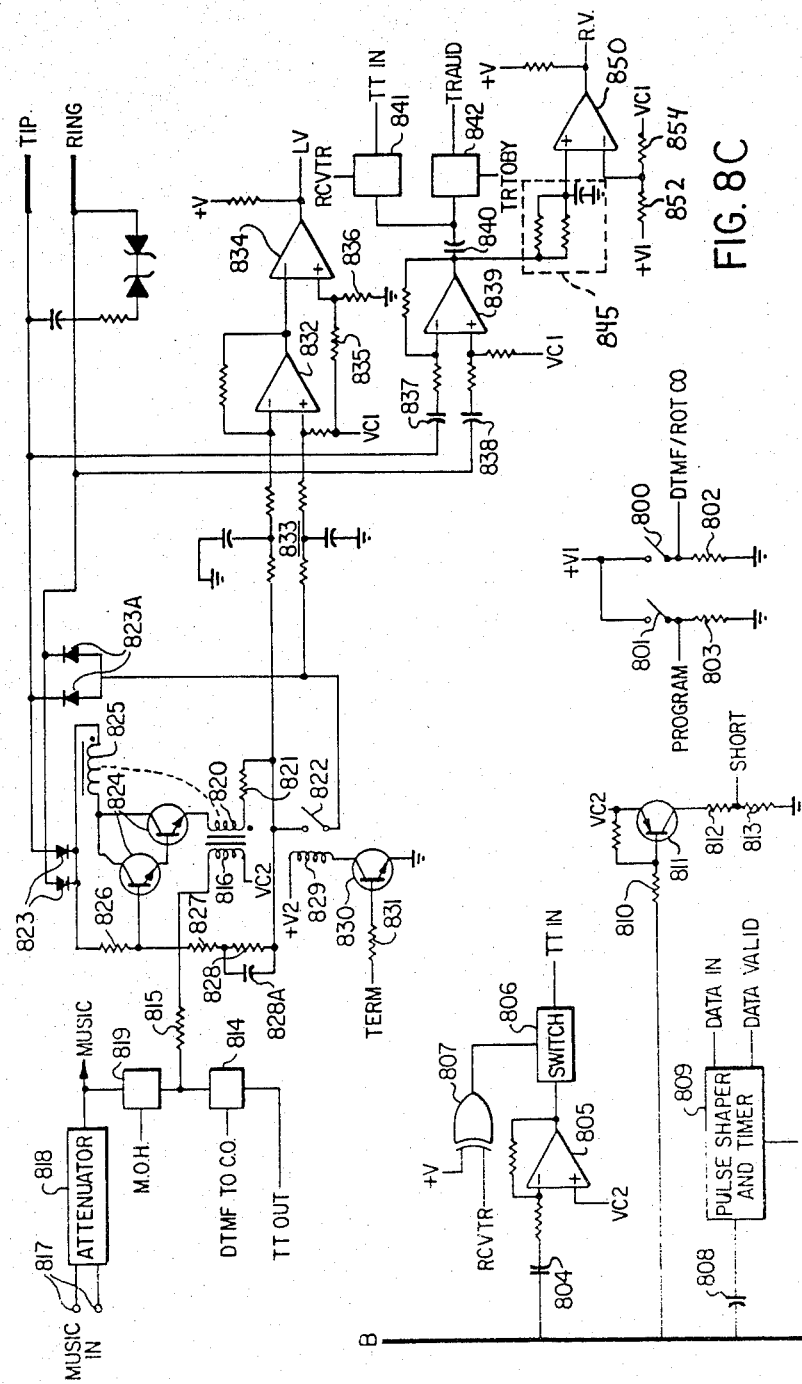

HOME COMMUNICATIONS AND CONTROL SYSTEM

This invention relates to telephone systems and particularly to a telephone system used in the home or office which provides special services to the telephone subscriber.

Telephone system subscriber's lines typically contain 4 wires, referred to conventionally as TIP, RING, SLEEVE, and GROUND. The private subscriber's line is usually terminated at the subscriber's home on a telephone block, and only the tip and ring leads are carried into the home. However the house is typically wired with a quad (4 conductor) cable. For normal single line private service, the subscriber's telephone set (along with any extensions) is connected to the tip and ring leads of the quad cable, which leads are connected to the tip and ring leads of the subscriber's loop cable connected to the central office (or other remote switching system). The remaining two conductors within the home (usually coloured black and yellow, respectively) remain redundant. The present invention utilizes all four wires to provide special services within the subscriber's home, of types often associated with a PABX, as well as other services.

Typical of the kinds of services which can be provided using this invention are tone ringing, paging, audio monitoring of a location within the home from another location within the home, operation of switch contacts from a remote location either inside or outside the home whereby apparatus, appliances or the like can be turned on or off, speed dialing, etc.

On the other hand, normally the only functions which can be provided at the home are the interconnection of extension telephones to the telephone line.

The services provided by the present invention can be obtained merely by connecting the apparatus described herein to the conventional telephone jacks which are connected to the quad cable within the subscriber's home. For certain of the services, the normal subscriber's sets (either DTMF or rotary dialing types) can be plugged into jacks within the apparatus. Of course normal telephone service is also provided, and in case of power failure, the apparatus defaults to normal telephone service.

Another telephone system, described in allowed U.S. patent application Ser. No. 286,871, now U.S. Pat. No. 4,459,434, utilizes a central control interposed between the subscriber's line and the local wiring in the home or office. The central control according to the present invention is connected to a conventional telephone jack within the home, such that the tip and ring leads are continuous from the central office to the quad telephone cable in the home.

Special service circuits form part of the invention and are located at various telephone jacks within the home, typically each containing a speaker, a microphone, amplifiers connected to the speaker and microphone, and circuits for enabling the amplifiers upon reception of address and enabling signals from the black and yellow leads. A telephone set plugged into a special service circuit is normally connected to the black and yellow leads, but if desired, and upon power failure, the telephone is connected to the tip and ring leads.

A control unit is also connected into a telephone jack, and, if desired, a special service circuit is connected into the control circuit. The control unit continually polls each of the special service circuits, and thus pushing of one out of a group of request for service pushbuttons associated with each of the special service circuits alerts the control unit as to a particular requested service. The control unit responds by sending an address and command signal to the special service circuit, enabling one of the amplifiers or causing some other special service to be performed, such as rapid dialing of one of a group of stored dialing digits, etc. Alternatively each of the special service circuits can have a specialized function, e.g. a typical circuit will have a speaker, an amplifier for driving the speaker, and a circuit for enabling the amplifier once an address and enabling signal has been received on the black and yellow leads. Thus some special service circuits need not have a telephone set connected into it, or located adjacent thereto.

According to the preferred operation of the invention, when a ringing signal is received from the local switching office via the tip and ring leads, the controller addresses each of the amplifiers associated with speakers, and applies ringing tone on the black and yellow leads for amplification thereby. Thus a pleasant ringing tone is heard throughout the house in the environment of each of the speakers, instead of the normal harsh ringing bell. The control monitors the black and yellow leads, and as soon as a subscriber answers by lifting a handset, it sends a signal to the special service circuit associated therewith, connecting the telephone set across the tip and ring leads, and inhibits tone ringing. The local subscriber can thus converse with the calling party over the continuous tip and ring leads.

Alternatively the subscriber can select normal bell ringing, by disabling or not selecting the tone ringing.

The local subscriber can also establish communication with any or all of the remote service circuits. After the control has enabled the amplifiers associated with the speakers upon the subscriber signaling to the control by means of pushing a button, he can speak into his handset microphone, and his voice signals are carried via the black and yellow leads to the speaker amplifiers, for paging.

The subscriber can also cause the enabling of an amplifier connected to a particular microphone, and another amplifier connected to a particular speaker, whereby monitoring of one of the rooms in his home (e.g. housing a baby) at any room can be effected.

The black and yellow leads will be referred to below alternatively as black (B) and yellow (Y) or as service leads.

In general, the invention is a service circuit for local telephone lines in buildings wired with quad telephone conductors, including a tip and ring lead pair continuous with a subscriber's line connected to a remote switching machine and a service lead pair, comprising a special service circuit for connection to the tip and ring lead pair and the service lead pair, and having a predetermined idling state, a control unit for connection to the tip and ring lead pair and the service lead pair, a circuit in the control unit for receiving signals over either the tip and ring lead pair or the service lead pair, and for generating a predetermined special service circuit enabling signal on the service lead pair. A circuit in the special service circuit is provided for receiving the enabling signal and for changing its state in response thereto, and the control circuit includes a circuit for applying operating power to the service lead pair.

The invention is also a service circuit for a local telephone line in a building wired with quad telephone conductors, including a tip and ring lead pair continuous with the subscriber's line connected to a remote switching machine and a service lead pair, comprising a control unit for connection to the local telephone line, a plurality of special service circuits, each including at least an amplifier and a speaker connected thereto, and a circuit for connecting a local telephone set to the local telephone line, normally to the service lead pair, but switchable to the tip and ring lead pair, and a circuit for generating request for service signals. A circuit is also included for receiving operating power from the service lead pair. The control unit includes a circuit for receiving the request for service signals from one special service circuit and for enabling operation of an amplifier in another special service circuit. Accordingly voice signals spoken into the local telephone set can be carried by the service lead pair to the amplifier of the other special service circuit and be output from the speaker connected thereto.

Figure 1:
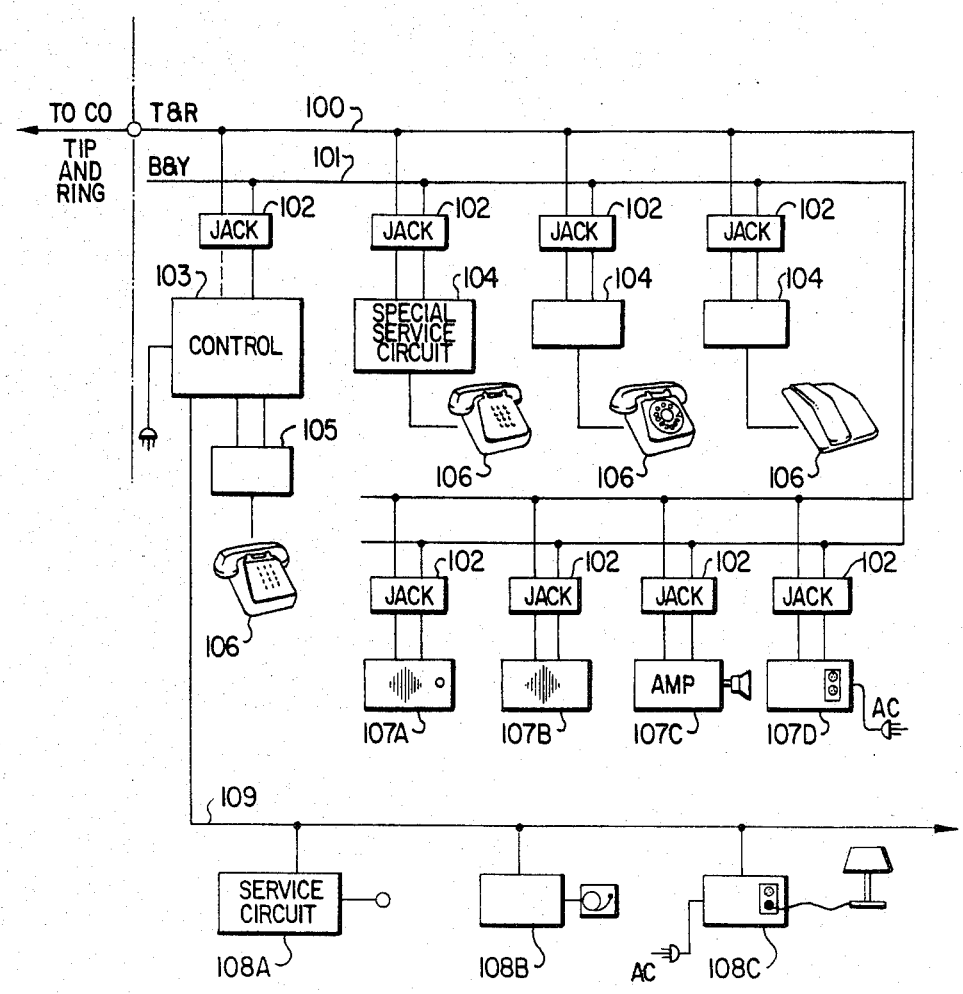
Figure 2:
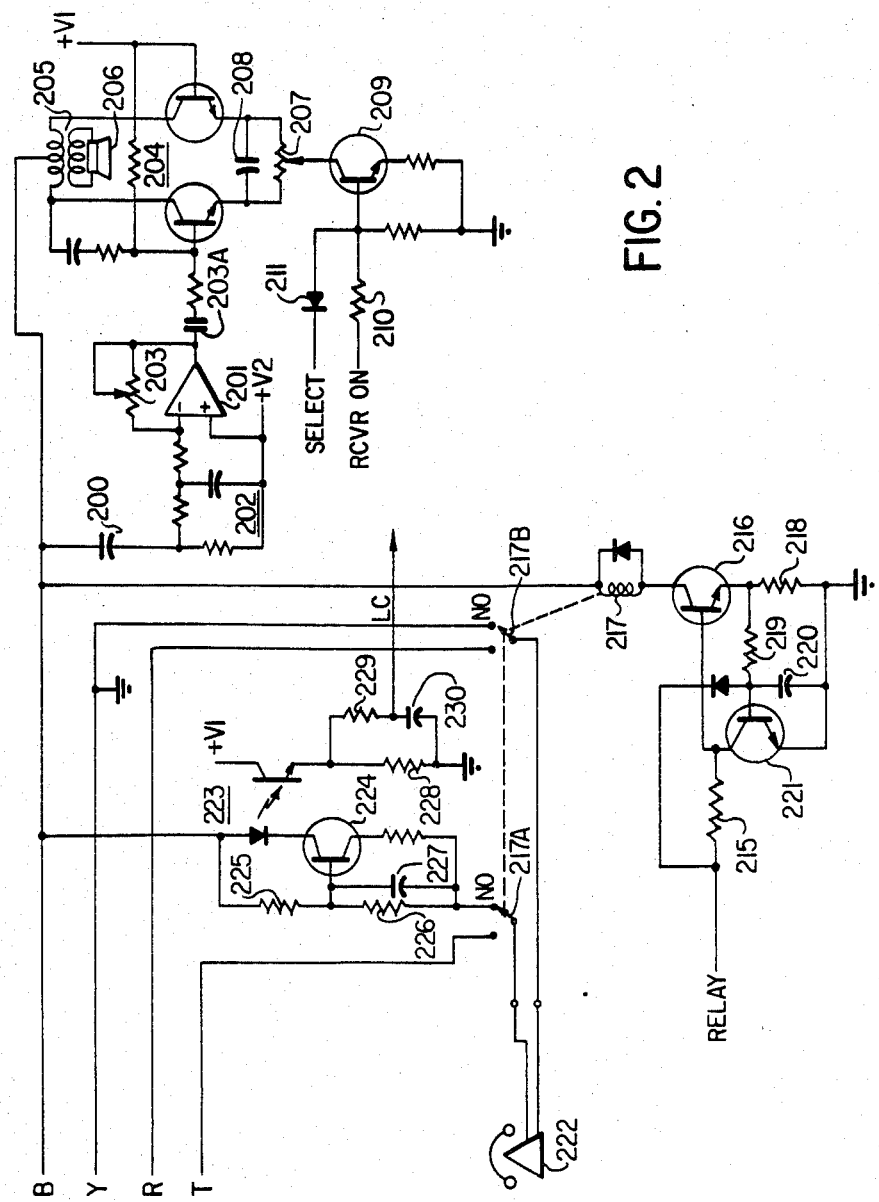
Figure 5:
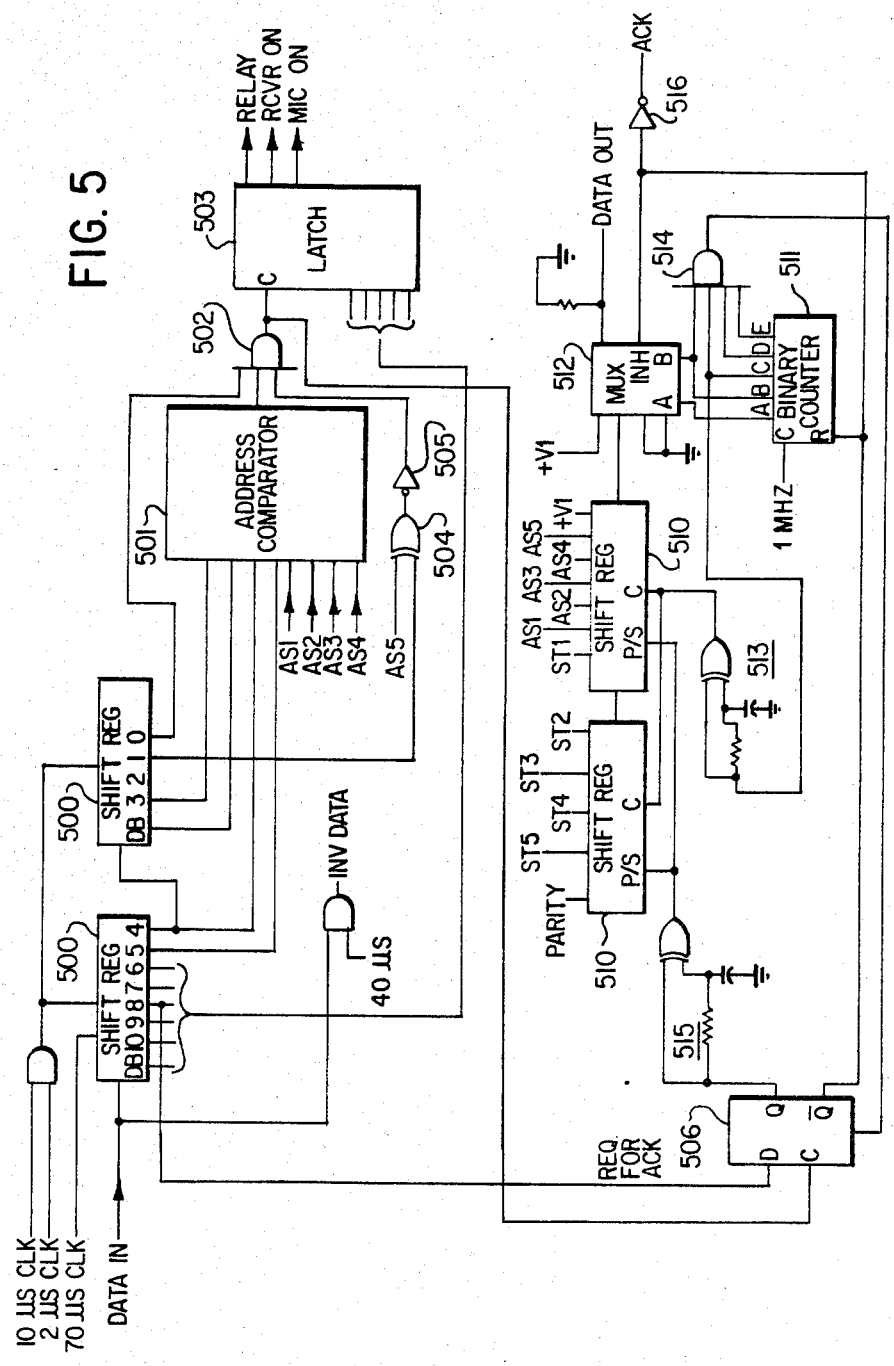

A better understanding of the invention will be obtained by reference to the detailed description below, and to the following drawings, in which:

FIG. 1 is a general block diagram of a fully outfitted installation of the invention, FIGS. 2, 3 and 4 form the various portions of the preferred embodiment of a special service circuit, FIG. 5 is a logic diagram of the logic block shown in FIG. 4, FIGS. 6A and 6B are block diagrams of various elements of the microprocessor portion of the invention at the controller, FIG. 7 shows the tone receiver and tone generator portions of the invention at the controller, and FIGS. 8A, 8B, 8C and 9 are schematic diagrams of other portions of the controller.

Turning first to FIG. 1, a typical installation in a home or other building is shown. The tip and ring leads 100 are continuous from the central office throughout the home. The black and yellow leads 101 are formed in a quad cable with the tip and ring leads within the home but do not extend to the central office. A plurality of telephone jacks 102 are connected to the tip and ring and black and yellow leads.

A control unit 103 is plugged into one of the jacks 102, and special service circuits 104 are plugged into other jacks. If it is convenient for the location of one of the special service circuits 105, it can be plugged into the control circuit. Telephone sets 106 either of multifrequency dialing type (referred to herein as TT) or rotary dial pulse type are plugged into the special service circuits 104, at locations chosen by the subscriber.

Other forms of special service circuits 107A-107D are plugged into any of the jacks 102.

The control 103 can also have a remote signalling port such as RS232 protocol type, and specialized special service circuits 108A-108C can be connected thereto, although special wiring is required therefor.

Each of the special service circuits has a plurality of pushbuttons, each of which designates a request for a different form of service (although the circuit can be designed to respond to requests for service constituted by predetermined dial digits from a telephone set). Each of the special service circuits 104 contains a microphone, a speaker, and an amplifier associated with each, each amplifier being enabled upon the special service circuit with which it is associated being addressed, and upon reception of a predetermined code for switching on either amplifier. Special service circuit 107A can be a door answering module which is similar. However special service circuit 107B can contain merely a microphone and an amplifier, for monitoring sounds in a room, e.g. a baby's crib. Special service circuit 107C can be used as an outdoor paging module, and thus will contain only an amplifier and speaker (and associated enabling circuitry). Special service circuit 107D contains a relay, an enabling circuit for the relay, and an outlet to which appliances such as lamps, etc., can be connected. It also has a power cord for connection to an A.C. wall outlet. Accordingly upon the relay being enabled or disabled, the lamp will turn on or off.

Special service circuits 108A-108C communicate with the control 103 via a bidirectional asynchronous bus 109. Accordingly a power control module 108C which operates, once enabled, similar to module 107D can be used to switch appliances one or off, while special service circuits 108A and 108B contain contacts which close and send signals to control 103 when smoke or burglar sensing contacts are closed or opened.

Each of the special service circuits 104 contains a plurality of pushbuttons, each designated to request a certain form of service from the control 103. Consequently, for example, to page, the subscriber lifts his handset, pushes a "page button", and dials a predetermined digit or digits. Alternatively no digits need be dialed if the control unit is in the page mode normally upon detection of an off hook condition of the handset. The signals (off hook, or digits) are carried via the black and yellow leads to the control, which in response sends an address and enable signal. In the case of paging, it would address all special service circuits which contain paging amplifiers (but not the door answer module), and also sends a signal enabling the amplifiers. The subscriber then speaks into this handset which is connected to the yellow and black leads, and his voice is amplified by all of the loudspeakers.

If the subscriber wishes to page only at one special service circuit, the button which he pushes (or the number he dials) would designate that particular special service circuit, and in response the control would only address that particular special service circuit and enable its amplifier.

If the subscriber wishes to monitor from a particular special service circuit, he dials digits which designate either the special service circuit to be monitored, or that special service circuit and another which is to be the monitoring location. In response the control sends out a signal on the black and yellow leads turning on the amplifier connected to a microphone at the designated special service circuit, and if desired, the amplifier connected to the loudspeaker associated with another special service circuit which is to perform hands free monitoring. Any of the functions could of course be cancelled by pushing a "cancel" button, which sends a tone to the control, causing it to disengage all functions previously set up. It is preferred, however, that the monitoring function should be shut off by dialing a digit designating "cancel".

If the local subscriber wishes to rapid-dial an outgoing call, he goes off hook, pushes a button which generates a request for rapid-dial service, which designates which number previously stored in the control memory should be outwardly dialed. The apparatus could be designed to respond to a push button request for rapid dial service, then choose the number in response to a single dialed digit, although the former is preferred. The control applies dialing tones to the tip and ring leads 100, feeding back side tone or the equivalent to the local subscribers set, and connects the local suubscriber's set to the tip and ring leads for completion of the call.

Alternatively, the local subscriber could have pushed a button indicating that a locally generated number is to be dialed out, and the control connects the telephone directly to the tip and ring leads, whereby the telephone set has access to the central office tip and ring leads.

Ringing signals received on the tip and ring leads are sensed by the control, the amplifiers in the special service circuits connected to speakers are addressed and enabled, and a warbling ringing tone is applied to the black and orange leads whereby the ringing tone can be heard throughout the house. When a subscriber goes off hook to answer the telephone, the control senses the off hook condition and connects the local telephone to the tip and ring leads.

It should be noted that one of the functions which can be effected by the control 103 is to disable any of the special service circuits upon request for this service. Therefore a person wishing to sleep near a telephone, for example, can send a signal as noted above to the control 103 which designates that the special service circuit associated with his telephone should not be enabled in the event of paging or ringing. In this condition, it is contemplated that fire alarm tones and directly dialed calls to the local pager should override the special service circuit inhibit.

It is also intended that the control 103 can be used to remotely control power contacts, or the like from outside the home. The control can have an internal timer for timing the length of time ringing is received. After receiving ringing for a predesignated time, e.g., 60 seconds, the control automatically terminates the line, effectively appearing to go off hook to the local switching office. The local subscriber, having dialed from any remote location, whether locally or long distance, then dials predetermined digits which are received by the control 103 as designating a request for service. Alternatively a hand-held tone generator can be placed in adjacency with the remote telephone microphone to generate the request for service tones.

In response, the control 103 causes the switching on of one or more power contacts in associated special service circuits, in the manner described earlier. Alternatively, the remotely located subscriber can have one or more paging amplifiers turned on, one or more microphones turned on, etc.

In addition, operation of the smoke or burglar alarm (or panic switch) causes the control 103 to dial out a predetermined number and, if a voice synthesizer is utilized, convey a message concerning an emergency over the central office line.

Turning now to FIGS. 2, 3 and 4, the contents of a special service circuit of the preferred form are shown. The special service circuit is comprised of an address and signal decoder which provides enabling signals and receives loop current indication signals, and apparatus operated in response to the enable signals or for generating the loop current signals. The apparatus operated by the enabling signals are an amplifier connected to a speaker, an amplifier connected to a microphone and a relay for connecting a telephone to the tip and ring leads; each special service circuit contains the decoder logic, and any one, two or three of the other circuits.

It is assumed that a person skilled in the art can provide all of the necessary biasing, voltage levels, etc., required for the circuits to be described. Therefore a description of the signal path aspects of the invention will be given in detail, but although biasing paths will be shown in the drawings, they will not be described in detail.

The black B lead is conventionally designated as carrying the signal, while the yellow Y lead is connected to ground. The tip T and ring R leads are connected through to the external tip and ring leads which lead to the central office or other switching machine. Connectors have not been shown in the drawing. One of the advantages of the present invention is that the ordinary already installed quad telephone line need not be disturbed; it is only necessary to ensure that the black and yellow leads are not short circuited together nor are connected to extraneous disturbing circuits or terminals.

Power is applied to the B and Y leads at the control. This power is passed through a local power supply which establishes the proper voltage V1 for the circuitry in the special service circuit. The power supply is conventional and will not be described in detail.

Signals from the B lead are passed through capacitor 200 and amplifier circuit 201 (with a 60 Hertz filter 202 or 300-3 KHZ bandpass filter connected to its input if desired for a higher quality embodiment), the amplifier having a gain control 203. The output signal from amplifier 201 is passed through an isolating capacitor 203 to push-pull power amplifier 204. The collectors of the transistors in power amplifier 204 are connected through an output transformer 205 to a loudspeaker 206. The center tap of the primary of transformer 205 is connected to the B lead, while the emitters of the transistors of power amplifier 24 are connected through the collector-emitter circuit of transistor 209 to ground. An enable lead RCVRON is connected through an input resistor 210 to the base of transistor 209, while another enable lead SELECT is connected through diode 211 to the base of transistor 209.

Audio signals on the B lead are thus carried through amplifier 201 to push-pull amplifier 204 where they are amplified and output from loudspeaker 206. The gain of the circuit is controlled by potentiometer 203. Signals to be amplifier include voice paging signals, ringing tone, etc.

When an enable signal on the RCVR lead goes high, transistor 209 switches on, and its emitter-collector circuit becomes conductive. This provides a current path from the B lead through the primary of transformer 205, the collector-emitter circuits of the transistors in power amplifier 204, transistor 209, to ground and the Y lead. Accordingly the power amplifier is switched on (enabled).

It should also be noted that if a low level signal appears on the SELECT lead when the RCVR lead is high, the base of transistor 209 is biased off; the SELECT lead thus overrides the RCVRON lead.

Turning for a moment to FIG. 3, signals picked up in a microphone 300 are applied to operational amplifier 301, preferably through a 60 hertz filter 302. Amplifier 301 passes signals from microphone 300 when its inverting input is at a lower bias level than its non-inverting input to which the microphone circuit is connected. The output of the amplifier is connected to the base of transistor 305 which has its collector-emitter circuit connected between the B lead and ground, (the Y lead).

A microphone enable signal appears on the MICON lead which is connected through resistor 306 to the base of transistor 307. The collector-emitter circuit of transistor 307 is connected from power source +V1 to ground, and the collector of transistor 307 is connected through diode 308 to the inverting input of amplifier 301.

When the voltage on the MICON lead is low (negative), transistor 307 is biased off, and the voltage at the anode of diode 308 is high, causing it to be conductive. A positive voltage +V1, dropped by resistor 309 and the threshold drop in diode 308, is applied to the inverting input of amplifier 301. This voltage, being more positive than the voltage on the non-inverting input of amplifier 301, turns the amplifier off.

However when an enable voltage on the MICON lead goes high, transistor 307 is biased on, effectively lowering the collector voltage toward ground. Diode 308 thus becomes back-biased and the inverting input of amplifier 301 reverts to the voltage established by resistor 304, from power supply +V2. Since this is adjusted to be more negative than the voltage on non-inverting input 301, amplifier 301 turns on. Signals picked up by microphone 300 are passed therethrough, are amplified in transistor 305 and are applied to the B lead.

A negative signal on the SELECT lead functions similarly to that on the SELECT lead in FIG. 2, effectively cancelling an enable signal on the MICON lead.

Alternatively, transistor 307 could be connected in the emitter circuit of transistor 305, turning the power amplifier portion of the circuit directly on or off.

Returning to FIG. 2, an enable signal on the RELAY lead is applied to a toggle circuit, through resistor 215, to the base of transistor 216. Transistor 216 becomes conductive in its collector-emitter circuit, passing current from the B lead through relay coil 217 to ground through emitter resistor 218. The voltage at the emitter of transistor 216 thus rises, passing current through resistor 219 to charge up capacitor 220. As the voltage across this capacitor rises, and is applied to the base of transistor 221, it causes that transistor to become conductive in its emitter-collector circuit, effectively shunting the base of transistor 216 toward ground. The current passing through the collector-emitter circuit of transistor 216 thus lowers. Accordingly relay 217 is initially operated by a large surge of current, which lowers as capacitor 220 charges up, whereby relay 217 is maintained with a low current flow.

A pair of transfer contacts 217A and 217B are associated with relay coil 217. The moving contacts are connected to the telephone set connector for connection to a telephone 222. The normally on contacts are connected through circuitry to the B and Y leads as will be described below.

The normally off contacts are connected to the tip and ring leads. One of the normally on contacts is connected to the Y lead, and the other is connected to a current sensing circuit as follows. The B lead is connected through the light emitting diode of optoisolator 223 which is connected in the collector-emitter circuit of transistor 224. The emitter circuit is connected to the normally on contact of transfer contact 217A. A resistor voltage divider comprised of resistors 225 and 226 (the latter bypassed by capacitor 227) is connected between the B lead and the normally on contact noted above.

The light sensitive transistor portion of optoisolator 223 is connected from power supply +V1 to ground through resistor 228 which is bypassed by the series circuit of resistor 229 and capacitor 230. The junction of the latter two components is shown as the LC lead (loop current detection).

Under normal conditions the telephone set is connected to the normally on contacts of transfer contacts 217A and 217B to the B and Y leads. As soon as the telephone handset goes off hook, current is drawn through resistors 225 and 226. This causes transistor 224 to become biased on, and current is drawn through optoisolator 223. The phototransistor in the optoisolator therefore swtiches on, drawing its emitter and lead LC toward the positive voltage +V1. Accordingly an off hook condition is manifested by lead LC going to positive potential, and an on hook condition is manifested by lead LC being drawn toward ground potential due to phototransistor 223 being non-conductive.

When an enable signal on the RELAY lead goes to high potential, the relay operation circuit associated with relay 217 causes this relay to close to its normally on condition. In the normal condition, therefore, telephone set 222 is effectively connected to the B and Y leads.

However, when the signal on the RELAY lead goes to low potential, relay 217 is released, and contacts 217A and 217B switch to the R and T leads, connecting the telephone set to the tip and ring, and hence to the outside telephone line.

It should be noted than in case of a power failure the normally positive voltage on the RELAY lead eventually reverts to ground potential, releasing relay 217, the contacts of which connect the telephone set to the tip and ring leads. In the fail safe default condition, therefore, the telephone set is restored to its normal connection to the tip and ring leads.

The LC lead thus carries indications of the telephone set being off hook, and dial pulses which are, of course, current interruptions.

Relay 217 could also of course operate power switching contacts rather than transfer contacts 217A and 217B. In this case only the address and enable signal decoder which will be described with reference to FIG. 4 and the circuit connected to the relay lead need be incorporated in the special service circuit. A power cord connected in series with a contact associated with the relay and an AC outlet would of course be included.

FIG. 4 illustrates the circuit which provides the enable signals on the RELAY, RCVRON, and MICON leads, as well as the SELECT lead.

The address of the local special service circuit is established in switch 400, by which any of the AS-1–AS4 leads connected thereto are connected to +V1. Each special service circuit used in a particular home would be given a different address by means of this switch, the addresses of which are stored in the control by the subscriber dialing predetermined digits designative thereof.

The B lead carries pulse data signals from the control, which are received by the special service circuit in a pulse shaper 401. The output square wave data signals are applied to a DATAIN input of a logic circuit 402. The logic circuit compares a portion of the received signal with the address code indicated on the AS1–AS5 leads, and if it does not match, ignores the remaining signal. If the signal does match, the remaining signal is decoded, and an output enable signal is applied to one or more of the RELAY, RCVRON or MICON leads. In this manner one or both of the amplifiers described with reference to FIGS. 2 and 3 are turned on and the telephone is switched to the tip and ring leads.

It should be noted that there are occasions in which both the receiver and microphone in a particular special service circuit may be enabled at the same time. In order to avoid acoustic feedback, both the RCVRON and MICON leads are connected to separate inputs of NAND gate 403, the output of which is connected to the SELECT lead. The SELECT lead thus goes to low potential if both receiver and microphone are enabled at the same time, but remains at high potential level if either are turned on.

The logic circuit 402 also includes circuitry for detecting whether the data input signal has parity (such circuitry being conventional and need not be described here), and circuitry for determining whether complete pulses have been received. Incomplete pulses or inaccurate parity result in a signal applied to the INVDATA lead which is applied through diode 404 to the inverting input of the amplifier and pulse shaper 401, effectively shutting it off whereby further data is not passed to the logic circuit 402.

Request for service signals are generated at the special service circuit as follows. A plurality of pushbutton keys 410 interface a keyboard decoder 411, e.g. type 74C922 available from National Semiconductor. When a key is closed, one or a group of leads KP1-KP4 are lowered in potential toward ground, being removed from their previous +V1 state through resistors 412. The KP1-KP4 leads are connected to ST1-ST4 leads which are connected to the logic circuit 402. Should a signal appear on the SELECT lead, the output of decoder 411 is disabled.

Logic circuit 402 encodes the voltage levels on the ST1-ST4 leads to a pulse code and applies it through the data out lead, amplifier 414 and transistor 415 to the B lead via capacitor 416. In this way request for service signals are generated by depression of one of the keys 410 in response to a request from the control which results in an encoded sequence of pulses being applied to the B lead.

We have thus seen how address and enabling signals are received from the controller, are checked for appropriate address, and if the address matches, a speaker amplifier, microphone amplifier or relay are switched on or off, and also how a request for service signal can be generated by depression of one of a plurality of key switches, which signals are converted to a series of pulses and applied to the B lead for receiption by the controller.

The controller can request an acknowledgement signal from the special service unit, the generation of which will be described with reference to FIG. 5. The acknowledgement signal appears on the ACK lead output from logic circuit 402 and is carried through inverter 417, transistor 418, capacitor 416 to the B lead.

Contents of logic circuit 402 are illustrated in FIG. 5. It should be noted that it is preferred that parity checking circuits should be included, lack of parity providing inhibit or reset signals to the various processing components, but since an understanding of the operation of the invention does not require the parity checking circuits, and since such circuits are conventional, they will not be described further.

In FIG. 4, an oscillator 419 is shown connected to logic circuit 402. A conventional circuit divides the oscillator circuit into various clock signals, e.g. 10 microseconds clock, 2 microseconds clock, 70 microseconds clock, 40 microseconds clock, etc. These clock signals will be utilized in the circuit to be described below.

With reference to FIG. 5, the data input signal is applied to the input of a pair of serially connected shift registers 500, the parallel outputs of the shift registers being referenced DB0-DB11 respectively. The address of the special service circuit is contained in bits DB2-DB5, and these are passed to an address comparator 501. The leads AS1-AS4 from switch 400 (FIG. 4) are also applied to the comparator, and if a match is found, an output signal is generated and is applied to one input of AND gate 502. The output of AND gate 502 is applied to the clock C input of a latch 503.

The DB0 output of shift register 500 is applied to another input of AND gate 502, which must be a "1" to enable latch 502. In addition, data bit DB1 of shift register 500 is applied to one input of exclusive OR gate 504, in the event jumper 420 is removed from the AS5 lead in FIG. 4. This lead provides an additional address function if desired. If the jumper 420 is in place, a ground appears on the AS5 lead connected to exclusive OR gate 504, which is inverted in inverting buffer 505, the output of which is connected to the AND gate 502.

Assuming that the address matches and a "1" appears as data bit 0 of the input data signal, a clock signal appears at the clock input of latch 503 from the output of AND gate 502. At the same time it is applied to the clock input of flip flop 506, to be described later.

Data bits 6-11 from shift register 500 are applied to the inputs of latch 503. Latch 503 also includes means for decoding and applying a high or low level signal to its output leads RELAY, RCVRON, and/or MICON, when clocked.

A sequence of data signals for transmission to the control is generated as follows. It was noted earlier that a code appears on the ST1-ST4 leads depending on which of the keys in key array 410 are depressed. The resulting signal is applied to the parallel inputs of shift register 510, formed of two portions serially connected. Twelve bits are sent in a message, pulses being either full or half time to designate a "1" or a "0". A 1 megahertz clock signal is applied to the C input of binary counter 511. The binary counter counts to five binary places, the first two being applied to the A and B inputs of a 4:1 multiplexer 512, to the input of which the serial output of shift register 510 is applied. The output of multiplexer 512 forms the data out lead.

Shift register 510 receives a clock signal from pulse forming circuit 513 (a well-known one shot circuit) which has its input connected to the C output of binary counter 511, and generates at its output a positive-going spike every time there is a transition at the C output of binary counter 511. Thus there is a shift of data in shift register 510 toward multiplexer 512 every four 1 megahertz pulses.

The A and B outputs of binary counter 511 are applied to correspondingly labelled inputs of multiplexer 512, and shifts the source of input signal from the four inputs, +V1, the output of shift register 510, ground and ground. Accordingly at the first megahertz pulse the data output is at a positive level +V1. At the time of the second pulse the output level from shift register 510 appears at the data output lead. If the output of shift register 510 is a "0", the signal is at ground potential. If the output of the shift register is a "1", the level is at +V1, resulting in a data output pulse for the period of two 1 megahertz clock pulses. Multiplexer 512 is then caused to receive inputs from the last two inputs in sequence, both of which are connected to ground. Since four 1 megahertz pulses have passed, the shift register 510 is clocked since a transition now appears on the C output of counter 511, causing a new data level to appear at the output of shift register 510 and at the second input of multiplexer 512. As binary counter 511 sequences, the output data on the data out lead is of the form of a pulse having the time period of one 1 megahertz pulse followed by a low or ground level for 3 following 1 megahertz pulse time periods, if the data to be output is a "0", and if the data bit is to be a "1", the pulse is of twice the period of the 1 megahertz clock followed by a low or ground level period for two 1 megahertz time periods. At the time of termination of each pulse on the data output lead, shift register 510 is clocked to apply a new bit value to the second input of multiplexer 512.

The B, C, D and E outputs of binary counter 511 are connected to respective inputs of AND gate 514, the output of which is connected to the RESET input of flip flop 506. This causes its Q output to go to high level and its $\overline{Q}$ output to go to low level, the latter resetting binary counter 511 and the former providing a pulse transition to the input of a second pulse forming circuit 515. A pulse is thus generated and resets shift register 510. Since AND gate 514 is enabled when binary counter 511 has counted 12, 4 megahertz periods, the message sent out on the DATAOUT lead consists of 12 bits.

The first bit applied to shift register 510 is +V1, and the following five bits are the address bits AS5-AS1 from the leads of the same designation applied to the input of address comparator 501. The following five bits are data bits ST1-ST5 generated as a result of depression of an request for service key. The final bit is a parity bit generated from a source (not shown) which can be from a parity calculator such as type 4531 available from Motorola Inc., to which the A1-A5 and ST1-ST5 bits are applied.

The depression of a predetermined request for service key thus results in a 12 bit message being serially shifted out on the data out lead when requested by the control which, as described with reference to FIG. 4, is applied to the B lead for reception by the control.

The control can also request acknowledgement from the special service circuit. In this case an address and a "1" for data bit 8 in shift register 500 is generated and received by the special service circuit. Upon confirmation of the address a clock signal is generated by the output of AND gate 502, which is applied to the clock input of flip flop 506. Data bit DB8 is also applied to the D input of the same flip flop, which causes its Q output to go high and its $\overline{Q}$ output to go to low level. The low level output is applied to the inhibit INH input of multiplexer (inhibiting its operation), and also causing a high level to appear on the ACK lead after being inverted in inverter 516. The signal on the ACK lead is applied through transistor 418 (FIG. 4) and to the B lead, from which it is received by the controller.

Turning now to FIGS. 6A and 6B, the microprocessor portion of the controller is illustrated. Microprocessor 600, e.g. type 6802 microprocessor manufactured by Motorola Inc., has an address bus formed of address lines A0-A14 connected thereto as well as a data bus comprised of data bus leads D0-D7 connected thereto in a conventional way. The VMA and RD/$\overline{W}$ leads are connected to the A0 and A1 input leads of a two bit decoder 601. The decoder has a pair of outputs, one of which is connected to the $\overline{E}$ lead of a READ decoder 602 and the other of which is connected to the $\overline{E}$ lead of a WRITE decoder 603. Accordingly the decoder 601 indicates on one of its output leads whether a READ or a WRITE signal is to be undertaken. Address lines A12, A13 and A14 of the address bus are connected to decoders 602 and 603. Accordingly the address leads of the READ or WRITE decoder is addressed and enabled with an address code applied to the A12-A14 and an enable READ or WRITE signal applied to a corresponding decoder $\overline{E}$ input. Six enable leads are connected to the READ decoder, $\overline{ROM3}$, $\overline{ROM2}$, $\overline{ROM1}$, $\overline{STRB2R}$, $\overline{STRB1R}$, and TOE. The WRITE decoder has five enable leads connected thereto, shown as $\overline{STRB2W}$, $\overline{STRB1W}$, $\overline{TTJEN\ WD}$, and S2. The $\overline{WD}$ is connected to a watch dog circuit 604.

Referring to FIG. 6b, three ROMs, e.g. type 2532 were found to be adequate, ROM1 605 being connected to address lines A0-A11 and data bus lines D0-D7, ROM2 606 being connected to address lines A0-A11 and data bus line D0-D7, and ROM3 607 being connected to the same address and data lines as ROM2 606. READ enable lead $\overline{ROM1}$ is connected to memory 605, $\overline{ROM2}$ READ enable lead is connected to memory 606 and $\overline{ROM3}$ READ enable lead is connected to memory 607.

Random access memories RAM1 608 and RAM2 609 are also utilized, each being connected to the A0-A9 address lines, memory 608 being connected to the data bus leads D0-D3 and memory 609 being connected to data bus leads D4-D7. Both memories 608 and 609 have their enable $\overline{E}$ leads connected together to a decode circuit and are backed up by a battery (not shown) in order to safeguard the contents thereof if the power should fail. The READ/WRITE leads of both memories are connected to the RD/$\overline{W}$ lead connected to the microprocessor.

Also connected to data bus leads D0-D7 are two WRITE ports 610 and 611 and a READ port 612, each being comprised of latches. Each of the READ and WRITe ports have port terminals to be described below, and to which various circuits of the control are connected.

The microprocessor, decoders, ROM and RAM memories and ports as an interactive unit is well known and a description thereof is available in various data catalogues and publications from Motorola, Inc. which manufactures the 6802 microprocessor. Of course other microprocessors could be used if desired. The microprocessor should be programmed to perform the functions described herein utilizing the novel circuitry described in detail. Since various forms of programs could be designed by persons skilled in the art understanding the structure and operation of this invention, a description of a program is believed to be redundant.

WRITE port 610 has a plurality of outputs, referred to herein as RCVTR, BM, M.O.H., DIGI, DATAEN, and DATA, while WRITE ports 611 has a plurality of outputs TERM, DTMF/CO, $\overline{OSC}$, OSCWOB, TONEEN, PWRDIS, and TRTOBY. Each of the outputs will be referred to in detail below.

READ port 612 has a number of inputs, referred to herein as RV, LV, PROGRAM, DTMF/ROTCO, SHORT, DATAIN, and DATAVALID.

FIG. 7 contains two blocks, tone receiver 700 and tone generator 701. Tone receiver 700 has an input TTIN and outputs connected to the D0-D3 and D7 data bus lines, and tone generator 701 has a plurality of inputs connected to the D0-D7 data bus lines and output TTOUT. The tone receiver 700 receives multifrequency tone signals, decoded them and provides a code on the output data bus leads. This can be an assembly of chips such as types 8865, 8860 available from Mitel Corporation, connected to latch type 541.

The tone generator 701 receives a coded signal on the data bus leads, an enabling signal on the $\overline{\text{TTGEN}}$ lead, and from the eight bits received on the data bus provides a synthenized output tone on the TTOUT lead.

Figure 8:
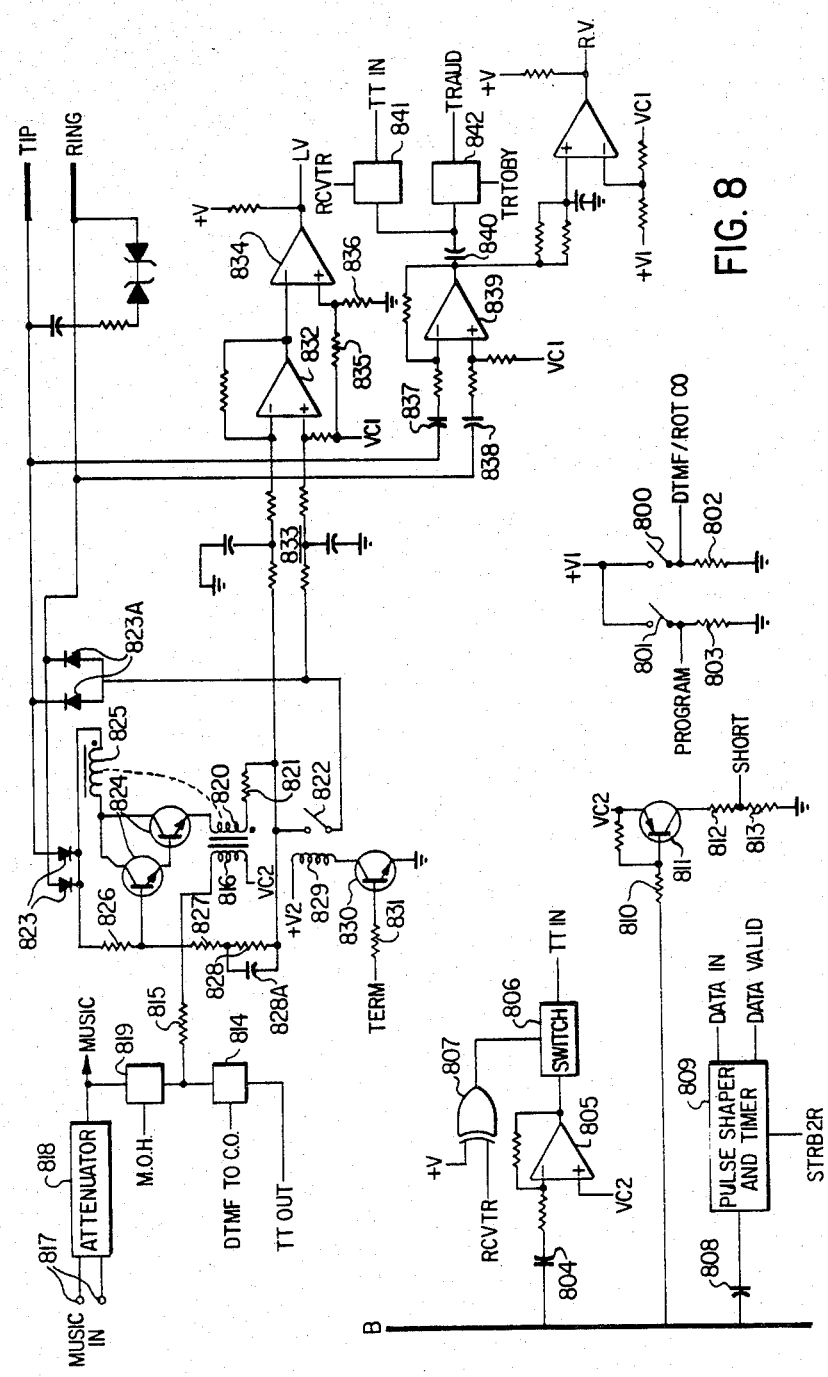

Turning now to FIG. 8A, a pair of switches 800 and 801 are connected between potential source V1 and ground through resistors 802 and 803 respectively. The junction of switch 800 and resistor 802 is connected to the DTMF/ROTCO input lead of READ port 612. When switch 800 is opened or closed, the controller is set to provide either multifrequency or rotary dial signaling to the central office via the tip and ring leads, when generating its own dialing signals (e.g. during rapid dialing).

The junction of switch 801 and resistor 803 is connected to the PROGRAM input of READ port 612. Consequently when this switch is closed, the microprocessor is set to receive programming signals from a telephone set connected to a special service unit, e.g. when the telephone set is storing the addresses of various special service units, or when it is storing digits (preceded by a predetermined code) of numbers which can be accessed for rapid dialing.

Alternatively the swtich 801 and resistor 803 can be deleted and the programming mode can be entered by dialing 00 on an associated telephone set.

Referring to FIG. 8B, the B lead is AC coupled through capacitor 804 to amplifier 805, which has its output connected through electronic switch 806 to the TTIN lead. The enable gate of switch 806 is connected to the output of EXCLUSIVE OR gate 807, which has one input connected to power supply source +V and the other connected to the RCVTR output lead of WRITE port 610. Accordingly when an output appears on the RCVTR lead, switch 806 is enabled, and dialing tones are passed through amplifier 805 to the TTIN lead of tone receiver 700, where they are decoded and applied as bits to the data bus, from where they are read by the microprocessor.

The B lead is also AC coupled through capacitor 808 to pulse shaper and time 809. This circuit is of conventional form, and receives data signals generated by the special service unit, reconstructs their square wave form, and times them, and operates when strobed on the STRB2R lead from READ decoder 602. If the data signals are correct, they appear on the DATAIN applied to READ port 602. At the same a signal appears on the DATAVALID lead, which lead is also input to READ port 612.

The data bus is also directly connected through resistor 810 to the base of transistor 811, which has its emitter-collector circuit connected from positive source VC2 and resistors 812 and 813 to ground. A SHORT lead connects the junction of the two resistors to the SHORT input of READ port 612. Due to the transistor 811 being of PNP type with its emitter connected to the positive supply, when the B lead has high positive voltage as it should be under normal operation, transistor 811 is non-conductive in its emitter-collector circuit, and the SHORT leads is at essential ground potential. However if the B lead becomes short circuited to ground for any reason, the base of transistor 811 drops in voltage, and the emitter-collector circuit begins conduction, raising the voltage on the SHORT lead. Accordingly a applied to the READ port and further read by the microprocessor. An alarm or at least disregard of any data signals considered to have been received on the B lead.

Figure 9:
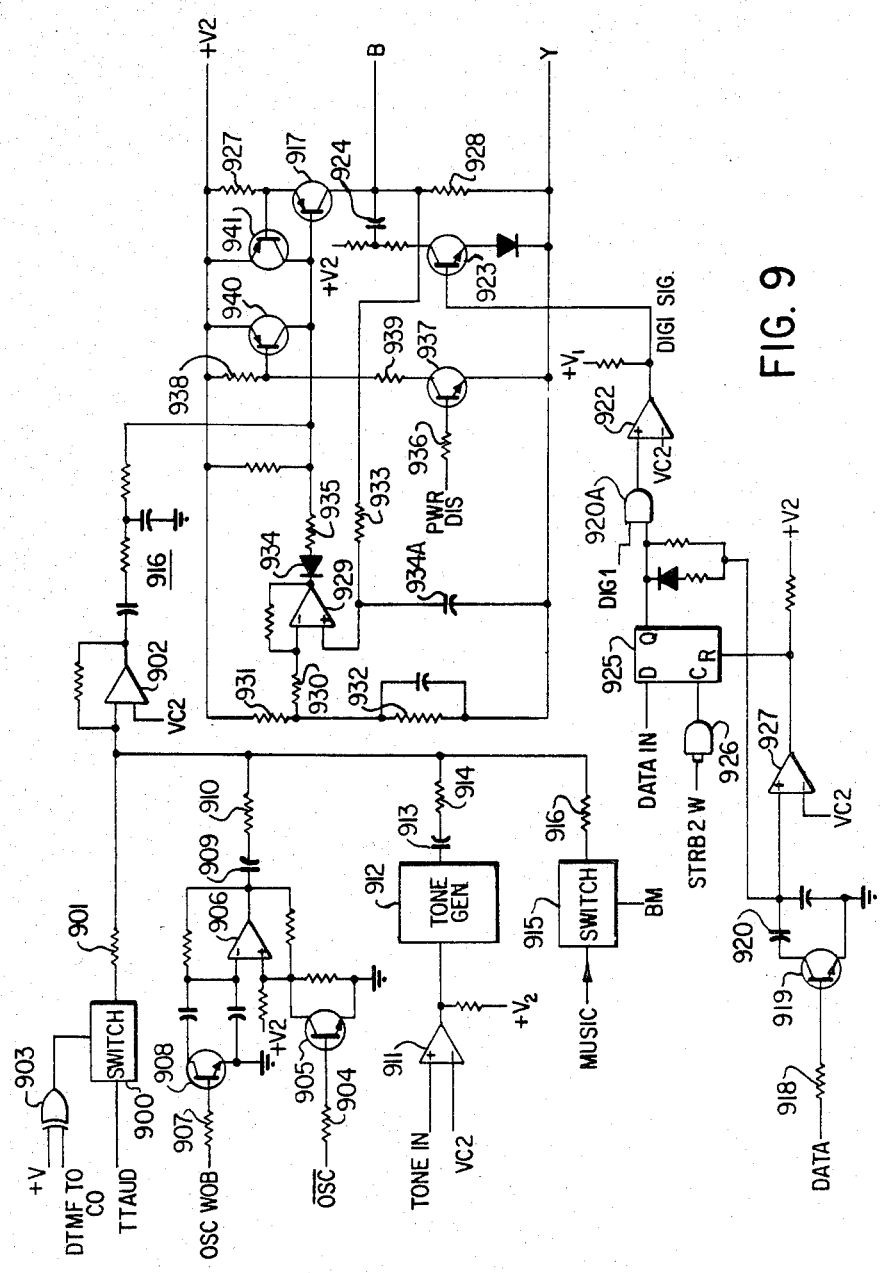

FIG. 8C, which refers to circuitry connected to the tip and ring lead leading to the central office will be described following a description of FIG. 9. The description above covered the operation of circuitry providing input signals to the microprocessor via READ port 612. The following is a description of signals written from the microprocessor via the WRITE ports which are applied to the B and Y leads.

A plurality of signals are generated to be applied to the B lead.

Tones generated in tone generator 701 having decoded a signal from the microprocessor are applied on the TTOUT input lead to electronic switch 900. The output of switch 900 is connected through resistor 901 to the input of operational amplifier 902. The enable gate of switch 900 is connected to the output of EXCLUSIVE OR gate 903, which has one input connected to potential source +V and the other to an output DTMF to CO of WRITE port 611. Accordingly when a signal appears on this lead generated by the microprocessor, switch 900 operates, closing and allowing multifrequency tones generated by tone generator 901 to be applied to the input of amplifier 902.

An oscillator signal generated by the microprocessor is applied to the $\overline{\text{OSC}}$ lead connected through resistor 904 to the input of transistor 905. Its output is connected in a circuit to the output of operational amplifier 906.

The OSCWOB output of WRITE port 611 generates a lower frequency signal which is used to modulate the OSC signal, to provide a "wobble" or cyclical variation in frequency of the oscillator signal. The OSCWOB signal is applied through resistor 907 to the input of transistor 908. Its output is connected to the input of amplifier 906, and the output thereof carries the modulated signal. This signal is AC coupled through capacitor 909 and resistor 910 to the input of operational amplifier 902.

The TTOUT signal is applied back to the B lead in order to provide side tone to an out calling party, to assure him that his call is being dialed to the central office. The wobbled oscillator tone is applied to the B lead in order to provide dial tone to a calling party.

The TONEEN output of the WRITE port 611 (FIG. 6) is applied to the input of operational amplifier 911, which has its output connected to the enable input of a tone generator 912. The output of tone generator 912 is AC coupled through capacitor 913 and resistor 914 to the input of amplifier 902.

When tone generator 912 is enabled from the microprocessor, ringing tone is generated, which is amplified by the addressed loudspeaker amplifiers in the special service circuits described earlier. Alternatively tone ringing can be enabled by increasing the gain of amplifier 906. i.e., by shorting part of the feedback path of amplifier 906.

Music signals are applied on the MUSIC lead, through electronic switch 915 and resistor 916 to the input of amplifier 902. A background MUSIC enable signal input of lead BM from WRITE port 610 enables switch 915.

Accordingly, any of the sound sources described above are enabled and applied to amplifier 902 as required by the frequency band shaping network 916 to the base of transistor 917, which has its collector connected to the B lead. Accordingly, when transistor 917 is enabled, any signals output from amplifier 902 are carried by the B lead. Alternatively amplifier 902 can feed an output transistor directly, which has its output connected to the B lead.

Data signals output from the DATA output of WRITE port 610 are applied through resistor 918 to the input of transistor 919, from which they are coupled through capacitor 920 in a circuit to one input of AND gate 920A. The output of AND gate 920A is applied through operational amplifier 922 to the base input of transistor 923, from which they are AC coupled through capacitor 924 to the B lead, for transmission to the special service circuits. The DATAEN output of WRITE port 610 is connected to the D input of flip flop 925, and the STRB2W output of WRITE decoder 603 is applied through a buffer 926 to the clock source of flip flop 925. The data signal from capacitor 920 is also connected to the input of operational amplifier 927, from which it is applied to the reset input of flip flop 925. In synchronism with the strobe from the microprocessor, and when the data enable signal is high, the data output signal from transistor 919 is allowed to enter AND gate 920A. AND gate 920A is enabled with the DID1 signal output of WRITE port 610.

With both analog and digital forms of signals being applied to the B lead, the remainder of the application circuit to the B lead will now be described. It was noted earlier that power must be applied between the B and Y leads in order to operate the special service circuits. This power is provided from source +V2 which is connected between the +V2 lead and the Y lead. However this power source must be a constant voltage source, but with high impedance (which would appear to be contrary requirements). However the requirement is such that if the voltage is pulled down, it rises up slowly, so that it appears like a high impedance. With this facility, voltage spikes appearing between the B and Y leads will not cause the power supply to react.

The power is applied from lead +V2 through resistor 927, the emitter-collector circuit of transistor 917 and resistor 928 to the ground or Y lead. Differential amplifier 929 senses the voltage on the B lead relative to the voltage on the +V2 lead. Its inverting input is connected through resistor 930 to the tap of a voltage divider comprising resistors 931 and 932 which are connected in series between the +V2 and ground or Y lead. The non-inverting input of differential amplifier 929 is connected to the B lead through resistor 933, and is also connected to the Y lead through capacitor 934A. The output of differential amplifier 929 is connected to the base of transistor 917 through diode 934 and resistor 935.

Capacitor 934A and resistor 935 form a time contant circuit through which capacitor 934A charges. Capacitor 934 is normally charged to the voltage on the B lead. Differential amplifier 929 sensing this voltage relative to the voltage at the tap of resistors 931 and 932 provides an output current which feeds the base of transistor 917, and controls the current passing through its emitter-base circuit to the B lead. Resistor 928 is relatively high, e.g. 100K.

Should the voltage on the B lead suddenly change, it takes sometime for capacitor 934A to discharge through resistor 933 (which may be 1 megohm and capacitor 934A may be 0.22 microfarads). Consequently the voltage sensed by differential amplifier 929 changes only slowly, with only slow change to the current passing from the +V2 lead to the B lead, thus providing the criterion described above of a simulated high impedance constant voltage source.

In order to stop feeding current to the B lead, a signal is received from the WRITE port 611 PWRDIS lead which is applied through resistor 936 to the base of transistor 937. This transistor has its emitter-collector circuit connected from the Y lead through the series circuit of resistors 938 and 939 to the +V2 lead. The junction of resistors 938 and 939 are connected to the base of transistor 940, which has its emitter-collector circuit connected between the +V2 lead and the base of transistor 917.

When a positive level signal appears on the PWRDIS lead from WRITE port 611, transistors 937 is caused to conduct, causing the base of transistor 940 to drop to low level, causing conduction of the emitter-collector circuit thereof. This effectively short circuits the base of transistor 917 to the +V2 lead, effectively shutting off conduction in its emitter-collector circuit, and thus effectively removing the flow of current to the B lead.

Transistor 940 has its base connected to the emitter of transistor 917 and its emitter-collector circuit between the +V2 lead and the base of transistor 917. As soon as transistor 917 begins to cease conduction, its emitter goes to low potential, causing transistor 940 to turn on, short circuiting the base of transistor 917 to lead +V2. This provides current limiting to the B lead.

Returning now to FIG. 8C, the circuitry ancillary to the tip and ring leads will now be described. The multifrequency dialing tones carried by the TTOUT output lead of tone generator 701 is applied through switch 814 to the primary winding 816 of a transformer for application to the tip and ring leads, and dial tone sensing by the central office or other switching machine.

A MUSIC source is applied to the MUSICIN terminals 817, and via an attenuator to bring the amplitude to levels acceptable to regulator agencies, through switch 819 to resistor 815 and the primary winding 816 of the transformer noted earlier. The output of attenuator 818 is also applied to the MUSIC input of switch 915, which can be enabled to provide background music in the home as requested buy the subscriber generating a request for service tone accordingly. The MUSIC input provided through switch 819 is intended to be returned to a subscriber externally connected to the tip and ring lead when placed on HOLD (e.g. music-on-hold). The enable input of switch 819 is connected to the M.O.H. WRITE enable lead from WRITE port 610, while the multifrequency dialing pulses applied on the TTOUT lead passes through switch 814 upon receipt of a signal on the DTMF/CO enabling lead connected to the WRITE port 611.

The secondary winding 820 of the transformer referred to above is connected between the emitter of the second transistor of a Darlington pair, through resistor 821, switch 822, and through diode bridge 823 to the tip and ring leads. The collectors of the Darlington pair 824 are connected through a tertiary winding 825 of the transformer to the diode bridge 823, and hence to the tip and ring leads. Tertiary winding 825 is also connected through series resistors 826, 827 and 828 to resistor 820, the junction of resistors 826 and 827 being connected to the base of the Darlington pair.

Switch 822 is a contact associated with relay coil 829, which is connected in the collector-emitter circuit of transistor 830. The base of transistor 830 is connected through resistor 831 to the TERM enable output lead of WRITE port 611.

In operation, a termination enable signal is received on the TERM lead, causing relay coil 829 to pull in switch 822. A circuit is thus conductive from the tip lead, through resistors 826, 827 and 828, switch 822 to the ring lead. This causes Darlington pair 824 to conduct, causing direct current from the central office to pass through tertiary winding 825 and secondary winding 820 of the transformer, from the tip to the ring lead through resistor 820 and switch 822.

However the tertiary and secondary windings are wound in opposing directions, causing the DC magnetic fields established as a result of the direct current to oppose and cancel. Thus saturation of the transformer due to the central office current is avoided, and good quality signals can be passed from the primary winding through the secondary and be applied to the tip and ring leads.

With the conduction of current through the Darlington pair 824, the tip and ring leads are effectively terminated, which, as is well known, advises the central office that the call has been put through to the local station. The termination thus provides means for holding an outside call while the local telephone set is disconnected from the tip and ring leads, and is conducting an internal page for a called party, for example. In this case, after the call has been established, the local subscriber pushes one of the keys on this special service circuit, sending a signal via the B lead to the controller, which is response sends a signal to the TERM lead, terminating the tip and ring. It then sends a signal to the special service circuit to operates its local relay and switch its local subscriber's set to the black and yellow leads. The local subscriber then dials a predetermined code which is received by the controller on the black and yellow leads, and in response addresses and enables the loudspeaker amplifiers in the remote units. The local subscriber speaks into his handset microphone, paging or providing a message to parties within earshot.

The local subscriber or another subscriber at another telephone set can then again push a designated key, signaling the controller that his telephone set is to be connected to the tip and ring leads and the hold is to be cancelled. The controller then sends a signal to the telephone set relay to connect it across the tip and ring leads, and also removes the TERM enable signal on the TERM lead. This opens switch 822. In case MUSIC ON HOLD is utilized, when the tip and ring is terminated, an enable signal is applied to M.O.H. lead connected to switch 819, causing the transmission of music through switch 819 to the primary 816 of the transformer, its secondary, and to the tip and ring leads.

A capacitor 828A is connected in parallel with resistor 828 which prevents alternating current from modulating the DC current passing through the secondary 820.

When switch 822 is opened, its leads are connected effectively across the tip and ring leads. A line voltage detector comprising differential amplifier 832 is connected through a balanced input network 833 thereto. The output of amplifier 832 is connected to the inverting input of differential amplifier 834, the non-inverting input being connected to the tap of a voltage divider comprising resistors 835 and 836 connected between voltage source VC1 and ground. This provides a threshold of operation of amplifier 834. When the voltage detected at the inputs of differential amplifier 834 drops to a predetermined level established by the voltage divider of resistors 835 and 836, amplifier 834 operates, providing a signal on its LV output which is input to READ port 612. This provides an indication to the controller when the local subscriber has gone off hook, when it is connected to the tip and ring leads, and also when the tip and ring leads are otherwise terminated, since the line voltage will drop upon these occurrences.

The tip and ring leads are also AC coupled through capacitors 837 and 838 in a circuit to the input of operational amplifier 839, which has its output AC coupled through capacitor 840 to the inputs of electronic switches 841 and 842. The output of switch 841 is connected to the TTIN input of tone receiver 700 and the output of switch 842 is connected to the TRAUD input of switch 814. The former is enabled from the RCVTR enable output of WRITE port 610 and the latter is enabled from the TRTOBY output of WRITE port 611.

When multifrequency dialing signals are received on the tip and ring leads, these are passed through amplifier 839 and switch 841 to the TTIN lead for reception by the microprocessor via tone receiver 700. While the reception of tone on the tip and ring leads at the subscriber's location is rather unusual, this facilitates remote switching of appliances, etc., by the subscriber at a remote location as described earlier.

Similarly, when speed dialing signals are generated by the controller and are output on the tip and ring leads, these signals are passed back through amplifier 839 and switch 842 to the TRAUD lead, from which they are applied to the TTAUD input of switch 900, for the provision of audio feedback to the calling subscriber, assuring him that the controller is dialing a call for him.

The output of operational amplifier 839 is also connected via low pass filter circuit 845 to a non-inverting input of operational amplifier 850, the inverting input thereof being connected to the tap of a voltage divider comprising resistors 852 and 854 connected between voltage sources +V1 and VC1. The voltage divider provides a threshold voltage of operation of amplifier 850. Ringing voltage, which is typically in the form of a 20 Hz, 90 volt RMS sinusoidal signal, carried by the tip and ring leads, is applied via A.C. coupling capacitors 837 and 838, operational amplifier 839, and filter circuit 845 to the non-inverting input of amplifier 850. The filtered ringing signal is typically greater that the aforementioned threshold voltage, such that amplifier 850 generates a high logic level signal on the R.V. output lead, for transmission to READ port 612, (FIG. 6B). This provides an indication to the controller of ringing signal having been detected on the tip and ring leads, which as a result causes a warbling ringing tone to be generated, whereby the ringing tone can be heard throughout the house, as described above.

The facilities afforded by the present invention can be utilized as follows. For intercom and paging, local telephone set extension to extension calling can be achieved by going off hook and dialing 1 digit. The controller detects the dialed number and sends a digital signal to the corresponding called special service circuit to enable its amplifier and also sends tone ringing thereto. When the second telephone set goes off hook, power on the B and Y leads from the controller allows handset to handset intercom. The paging function was described earlier.

To provide an outgoing call, the digit 9 can be dialed, or a special button can be pushed.

Paging can be provided either by dialing to activate a single loudspeaker amplifier, or two numbers can be dialed to turn on all amplifiers until the subscriber goes on hook.

Common dialed numbers can be stored in the controllers memory. Numbers can be accessed by dialing two digits or pushing a special button, the stored numbers being automatically dialed out in DTMF or rotary pulses, depending on the setting of a switch.

The controller, monitoring the lines, can record the last number dialed from any extension and automatically redialed when two special "last number recall" numbers are dialed.

The controller can be set to ring the standard telephone bell by connecting the telephone set across the tip and ring leads, or can apply a distinctive tone to local loudspeaker amplifiers. Incoming calls can be answered fro any telephone set.

Outside calls can be placed on hold by pushing a predetermined key switch on the special service unit. The user can transfer the call to another extension by making an intercom call, or can then hang up and pick up the call at another extension.

The controller can be set to convert DTMF tones dialed by the subscriber on the local telephone set to dial pulses which might be required by the central office to which it is to be connected.

A special service unit module can be installed at each door. When a visitor presses a button on the module, the controller can be set to determine which door module is calling by analyzing a distinctive tone or series of pulses transmitted therefrom, and then generate a distinctive ring transmitted to each of the other special service units which identifies the location of the visitor. The visitor can then be questioned by voice contact from any intercom special service unit in the home.

A special service unit can be plugged into a telephone jack installed in a baby's room. A special dial code dialed by the subscriber at his special service unit will turn on the transmitter of the baby monitor, allowing any noise in the room to be monitored at any selected special service unit.

A remote paging specail service unit can be provided which simply amplifies and broadcasts voice signals to areas inside or outside the home or office. This unit includes an amplifier which is powered from the electrical mains. A special dial code then is used to access up to as many paging zones as might be originally set up, e.g. one or two. This feature is useful for patio, workshop, warehouses, etc.

Calling in from a remote location, the system can be used to allow the home owner or office manager to turn lights on and off, close or lock doors, etc. by accessing the power contact special service unit as described. The power contact unit is activated by dialing a special number from any extension, or the controller can be set to trip ringing after a specified time and accept a DTMF security code dialed by a caller anywhere in the world. The caller can then gain access to any of the control features of the apparatus described above.

It is believed that the present invention provides a substantially improved utility for the home or office. A person understanding this invention may now conceive of variations or other embodiments using the principles described herein. All are considered to be within the sphere and scope of the invention as defined in the claims appended hereto.

We claim:

1. A service circuit for a local telephone line in a building wired with quad telephone conductors, including a tip and ring lead pair continuous with a subscriber's line connected to a remote switching machine and a service lead pair, comprising:
   (a) a special service circuit for connection to the tip and ring lead pair and the service lead pair, and having a predetermined idling state,
   (b) a control unit for connection to the tip and ring lead pair and the service lead pair,
   (c) means in the control unit for receiving signals over either the tip and ring lead pair or the service lead pair, and for generating a predetermined special service circuit enabling signal on the service lead pair,
   (d) means in the special service circuit for receiving said enabling signal and for implementing one or more special services in response thereto, and
   (e) means for applying operating power to the service lead pair.

2. A service circuit as defined in claim 1, in which the special service circuit is adapted to receive the enabling signal which includes a predetermined address, and for implementing said one or more special services in response to reception of said address and an additional predetermined signal portion of said enabling signal.

3. A service circuit as defined in claim 2, in which the special service circuit includes means for connecting a local telephone set to either the tip and ring lead pair or said service lead pair, means for retaining connection of said telephone set normally to the service lead pair, signalling means for applying a predetermined request for service signal to the service lead pair, and in which the control unit includes means for responsively applying said predetermined special service circuit enabling signal to the service lead pair.

4. A service circuit as defined in claim 3, in which the special service circuit includes an amplifier and associated speaker for connection to the service lead pair and enabling means for enabling the amplifier upon receipt of said predetermined special service circuit enabling signal including said address.

5. A service circuit as defined in claim 3, in which the special service circuit includes means for switching connection of the local telephone set to the tip and ring lead pair and enabling means for enabling said switching means upon reception of said predetermined special service circuit enabling signal including said address.

6. A service circuit as defined in claim 3, in which the special service circuit includes a microphone and associated amplifier for connection to the service lead pair and enabling means for enabling the amplifier upon receipt of said predetermined special service circuit enabling signal including said address.

7. A service circuit as defined in claim 4, 5 or 6, in which the special service circuit includes a switch comprised of a plurality of switch contacts for generating a local address signal, shift register means connected in a circuit to the service leads for receiving said predetermined special service circuit enabling signal, comparator means for comparing the address included in said enabling signal with the local address signal, and means for generating a switching signal for operating the enabling means upon the comparator means indicating a matching of the address included in said enabling signal with the local address signal.

8. A service circuit as defined in claim 4, further including means for switching connection of the local telephone set to the tip and ring lead pair and means for enabling said switching means upon reception of a second predetermined special service circuit enabling signal including said address.

9. A service circuit as defined in claim 8, in which the special service circuit includes a switch comprised of a plurality of switch contacts for generating a local address signal, shift register means connected in a circuit to the service leads for receiving said first and second predetermined special service circuit enabling signals, comparator means for comparing the address included in said enabling signals with the local address signal, and means for generating a first signal for enabling the amplifier and a second signal for operating the switching means upon reception of said first and second predetermined special service circuit enabling signals including said address, respectively.

10. A service circuit as defined in claim 3, in which the special service circuit includes a first amplifer, a speaker connected to the output of the amplifier, a second amplifier, a microphone connected to the input of the second amplifier, switching means for switching connection of the local telephone set to the tip and ring lead pair, means for enabling the first or second amplifier or operating the switching means upon reception of a first, second or third predetermined special service circuit enabling signal including said address.

11. A service circuit as defined in claim 10 in which the special service circuit includes a switch comprised of a plurality of switch contacts for generating a local address signal, shift register means connected in a circuit to the service leads for receiving said predetermined special service circuit enabling signal, comparator means for comparing the address of said enabling signal with the local address signal, and means for generating a first signal for enabling the first amplifier, a second signal for enabling the second amplifier, and a third signal for operating the switching means upon reception of said first, second or third predetermined special service circuit enabling signal including said address.

12. A service circuit as defined in claim 1 or 2, in which the special service circuit includes a relay, means for operating the relay in response to reception of said predetermined service circuit enabling signal, and contact means operated by the relay for control of an external switchable apparatus.

13. A service circuit as defined in claim 1, 2 or 3, in which the control circuit includes said means for applying operating power to the service lead pair for reception by said special service circuit.

14. A service circuit for a local telephone line in a building wired with quad telephone conductors, including a tip and ring lead pair continuous with a subscriber's line connected to a remote switching machine and a service lead pair, comprising:
(a) a control unit for connection to the local telephone line,
(b) a plurality of special service circuits, each including at least an amplifier and a speaker connected thereto, and means for connecting the input of the amplifier to the service lead pair, and means for connecting a local telephone set to the local telephone line, normally to the service lead pair, but switchable to the tip and ring lead pair, and means for generating request for service signals, and
(c) means for applying operating power to the service lead pair,
(d) the control unit including means for receiving said request for service signals from one special service circuit and for enabling operation of an amplifier in another special service circuit,
whereby voice signals spoken into the local telephone set can be carried by the service lead pair to the amplifier of the other special service circuit and be output from the speaker connected thereto.

15. A service circuit for a local telephone line in a building wired with quad telephone conductors, including a tip and ring lead pair continuous with a subscriber's line connected to a remote switching machine and a service lead pair, comprising:
(a) a control unit for connection to the local telephone line, and
(b) a plurality of special service circuits, each including at least a first amplifier, a speaker connected to its output, a second amplifier, a microphone connected to its input, means for connecting a local telephone to the local telephone line, normally to the service lead pair, but switchable to the tip and ring lead pair, and means for generating request for service signals,
(c) the control unit including means for receiving said request for service signals from one special service circuit and in response for enabling the second amplifier of one special service circuit and the first amplifier of another special service circuit whereby sounds received by the microphone of the one special service circuit are carried by the service lead pair and amplified and reproduced by the speaker of the other special service circuit.

16. A service circuit as defined in claim 14 or 15 including means in each special service circuit for connecting the local telephone to the local telephone line in the event either of the absence of operating power on the service lead pair or the reception by a special service circuit of a predetermined signal, including address, whereby direct outgoing and incoming telephone communication can be made between the local telephone and the tip and ring leads connected to said remote switching machine.

17. A service circuit for a local telephone line in a building wired with quad telephone conductors, including a tip and ring pair continuous with a subscriber's line connected to a remote switching machine, and a local service lead pair, comprising:
(a) a first special service circuit connected to the quad telephone conductors to which one or more local telephones are connected, for providing a signal path between said tip and ring pair and said local service lead pair,
(b) means including a loudspeaker connected to the first special service circuit, for reproducing a message spoken into a microphone of one of said local telephones and carried by said signal path, and
(c) control means connected to the quad telephone conductors for enabling the means including the loudspeaker upon said one of the local telephones going off hook.

18. A service circuit as defined in claim 17 including a second special service circuit connected to the quad telephone conductors having a microphone, and control means connected to the quad telephone conductors for enabling the second special service circuit and said means including the loudspeaker for causing the reproduction of sounds received in the microphone in said loudspeaker upon reception of a predetermined signal from the first special service circuit.

19. A service circuit as defined in claim 17 including means in the first special service circuit for connecting a telephone set to the tip and ring pair upon generation of a command signal thereat, to facilitate completion of telephone calls via the remote switching machine.

20. A service circuit as defined in claim 1, further including a remote control special service circuit connected to the quad telephone conductors, and a control circuit for receiving control signals from the tip and ring leads, and for enabling operation of the remote control special service circuit in respone thereto.

21. A service circuit as defined in claim 20, including means in the control circuit for terminating incoming telephone calls on the tip and ring leads, and for receiving said control signals from the tip and ring leads.

22. A service circuit as defined in claim 20, including means in the control circuit for receiving further control signals from the service lead pair.

* * * * *